Oct. 13, 1942. T. WILSON 2,298,780
GRIDDLE
Filed Oct. 1, 1941
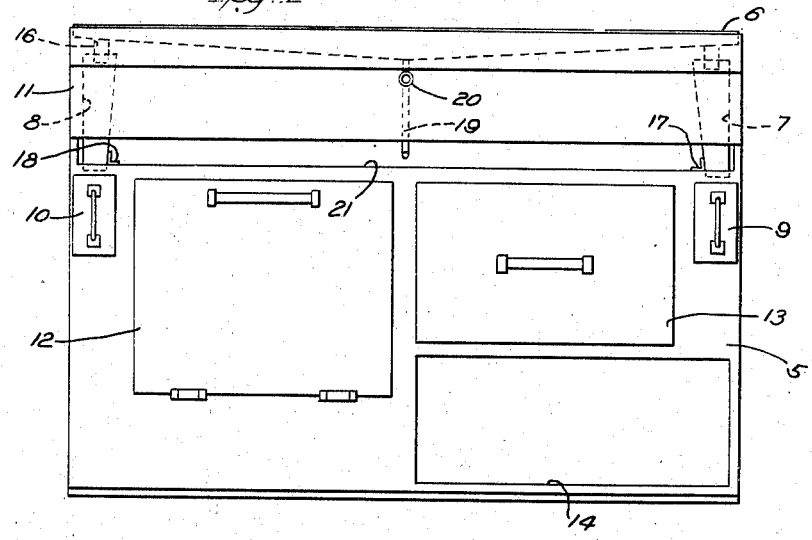
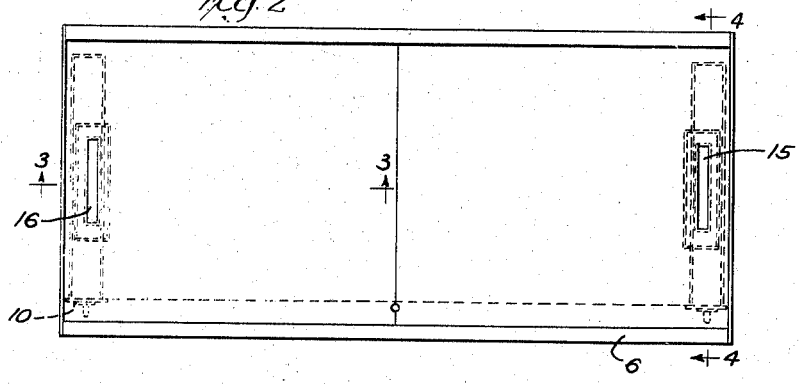
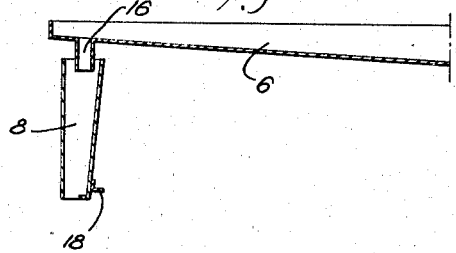
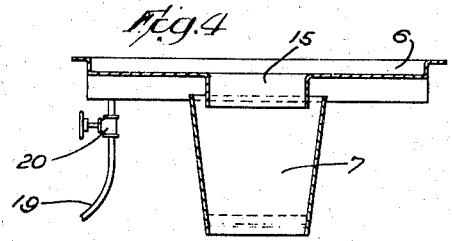
Inventor
Thad Wilson Patented Oct. 13, 1942

2,298,780

UNITED STATES PATENT OFFICE 2,298,780

GRIDDLE

Thad Wilson, Gary, Ind., assignor to Biddie In A Basket, Inc., a corporation of Indiana Application October 1, 1941, Serial No. 413,082

3 Claims. (Cl. 53—5)

My invention relates to griddles and more particularly to griddles of the type used in commercial establishments.

It is an object of my invention to provide a new and improved griddle suitable for use in commercial establishments.

Another object of my invention is to provide an improved griddle suitable for ordinary or deep fat frying which is economical of fat, convenient to use and easy to clean.

Other and further objects of my invention will become more readily apparent by reference to the following description taken in connection with the accompanying drawing wherein:

Figure 1 is a front view of the supporting structure for my griddle;

Figure 2 is a top view of the griddle;

Figure 3 is one half of a longitudinal section of the griddle taken through the center along the line 3—3 of Figure 2; and Figure 4 is a lateral cross sectional view through the grease and refuse opening and duct to one end of the griddle as seen along lines 4—4 of Figure 2.

Referring more particularly to Figure 1 there is shown a griddle supporting structure 5 which supports a rectangular griddle 6, a pair of ducts 7, 8 and a pair of drawer receptacles 9, 10. The portion 11 of the supporting structure 5 immediately beneath the griddle 6 is utilized to house a plurality of burners for heating the griddle. The supporting structure 5 may also be provided with various compartments such as an oven having a door 12, a drawer 13 and a shelf 14.

From Figure 2 it will be seen that the griddle 6 has a bottom of substantially rectangular shape surrounded by suitable walls, and that adjacent the ends of the griddle there are provided relatively narrow rectangular openings 15 and 16. Each of the rectangular openings 15, 16 is spaced apart from the end walls of the griddle and is of substantially less length than the width of the griddle, and preferably of a length which is less than half of the width of the bottom of the griddle 6. The openings 15, 16 are arranged equidistant from the side walls and at the high ends of the griddle 6 to permit the disposal of surplus oil, fat, or refuse.

By referring to Figures 3 and 4 in connection with the other figures of the drawing it will be seen that the rectangular refuse openings 15 and 16 communicate with funnel-like ducts each having a rectangular cross section. These ducts 7 and 8 are each mounted on or supported by the supporting structure 5 by means of suitable brackets 17 and 18. Preferably the ducts are removably mounted so that they may be more easily cleaned. The ducts 7 and 8 are placed in alignment with the openings 15 and 16, and directly beneath the ducts 7 and 8 there are located the drawer receptacles 9 and 10 supported by the frame 5. The drawers 9 and 10 are provided with suitable handles so that these drawers may be readily removed for cleaning purposes.

The bottom of the griddle 6 slopes from each end thereof toward the center to provide a central portion for deep fat frying. In deep fat frying it is desirable to renew the cooking oil or fat to maintain the flavor and palatability of the cooked food at a high standard, yet the process must not be wasteful of fat. The present structure provides deep fat frying with a minimum consumption of fat. At the center adjacent the front edge of the bottom of the griddle there is provided a drain pipe 19 and a valve 20 therefor so that all of the cooking oil or fat on the griddle may be removed.

The griddle heretofore described is particularly suited for deep fat frying as well as for ordinary frying, and during use a considerable quantity of fat or cooking oil may be kept in the central portion of the griddle. The articles of food to be fried are placed in the fat and as the cooking approaches completion the food is moved toward the outer end of the griddle for final browning, and for storage to keep the food warm. In the course of such preparation of food small particles thereof are apt to break off, and the accumulation of such particles constitutes refuse which should be removed from the griddle by a suitable implement. This refuse may be scraped toward the outer ends of the griddle bottom thus permitting the cooking oil or fat to drain back toward the center, and the refuse is disposed of by scraping it into one of the rectangular openings at the end of the griddle. By moving the food from the center toward each of the ends of the griddle the food is moved a lesser distance than would be the case if the griddle sloped from one end to the other, and consequently, there is less loss of food due to the breaking off of small particles. Whenever it is desired to remove all of the cooking oil or fat from the griddle either for the purpose of replenishing with fresh cooking oil or fat, or for cleaning the griddle preparatory to a considerable period of non-use, a suitable container may be placed upon the shelf 21 directly beneath the drain pipe 19 and by means of a valve 20 the cooking oil or fat may be released from the griddle into this container.

It will be readily appreciated by those skilled in the art that the present invention offers many advantages heretofore not found, and while the preferred embodiment of the invention has been shown and described, it is to be understood that modifications may be made therein which fall within the spirit and true scope of the appended claims.

What I claim as new and desire to secure by Letters Patent of the United States is:

1. A griddle having four walls and a rectangular bottom sloping from each end thereof toward the center to provide a deep fat frying portion thereat, a plurality of narrow rectangular openings located in said bottom adjacent each end thereof and spaced apart from said walls, a support for said griddle, a tapered duct for each of said openings, said duct having a rectangular cross section and being detachably mounted on said support in alignment with said griddle opening, and a removable receptacle for each duct, each receptacle being carried by said support and positioned in alignment with one of said ducts.

2. A griddle having four walls and a rectangular bottom sloping from each end thereof toward the center to provide a deep fat frying portion, a plurality of narrow rectangular openings each located in said bottom beyond said deep fat frying portion adjacent one of said ends of said griddle and spaced apart from the end walls, each opening being located equidistant from the side walls and of substantially lesser length than the width of said bottom, a support for said griddle, a plurality of tapered ducts each having a rectangular cross section, each of said ducts being attached to said support in alignment with one of said griddle openings, and a plurality of removable drawer receptacles for said ducts carried by said support and each positioned in alignment with one of said ducts.

3. A griddle having four walls and a rectangular bottom sloping from each end thereof toward the center to provide a central portion for deep fat frying, a drain and valve therefor connected to said bottom at the center adjacent the front wall of said griddle, a plurality of narrow rectangular openings each located in said bottom adjacent one of the ends of said griddle and spaced apart from the end walls, said openings being located equidistant from the side walls and of substantially lesser length than the width of said bottom, a support structure for said griddle, a plurality of tapered rectangular cross-section ducts for said openings, said ducts each being removably mounted on said support in alignment with one of said griddle openings, and a plurality of removable drawer receptacles carried by said supporting structure and each positioned in alignment with one of said ducts.

THAD WILSON.